United States Patent
Nagoya

(10) Patent No.: US 6,720,970 B2
(45) Date of Patent: Apr. 13, 2004

(54) IMAGE DRAWING APPARATUS, IMAGE DRAWING METHOD AND MEMORY MEDIUM

(75) Inventor: Kenji Nagoya, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 09/158,819

(22) Filed: Sep. 23, 1998

(65) Prior Publication Data

US 2002/0033831 A1 Mar. 21, 2002

(30) Foreign Application Priority Data

Sep. 24, 1997 (JP) .............................................. 9-274995

(51) Int. Cl.[7] ................................................ G09G 5/00
(52) U.S. Cl. ...................................... 345/581; 715/528
(58) Field of Search .................................. 345/153, 433, 345/431, 520, 501, 348, 964, 358, 420, 441, 3, 112, 26, 619, 581, 631; 707/530, 532, 500; 395/114, 615; 715/526, 527, 528; 358/1.17

(56) References Cited

U.S. PATENT DOCUMENTS

| | | | | | |
|---|---|---|---|---|---|
| 5,257,015 | A | * | 10/1993 | Inoue | 345/26 |
| 5,337,410 | A | * | 8/1994 | Appel | 345/501 |
| 5,379,376 | A | * | 1/1995 | Bednowitz | 345/501 |
| 5,471,563 | A | * | 11/1995 | Dennis et al. | 395/114 |
| 5,732,264 | A | * | 3/1998 | Tanaka | 395/615 |
| 6,084,687 | A | * | 7/2000 | Miyazaki et al. | 358/1.17 |

FOREIGN PATENT DOCUMENTS

JP    8-63310    3/1996    ............. G06F/3/12

* cited by examiner

*Primary Examiner*—Matthew Luu
(74) *Attorney, Agent, or Firm*—Fitzpatrick, Cella, Harper & Scinto

(57) ABSTRACT

In order to reduce the frequency of switching of the drawing attribute, the data of the drawing request are classified according to the drawing attribute, and the data are re-arranged in the unit of such classification, whereby the data of a same classification are outputted in succession.

28 Claims, 17 Drawing Sheets

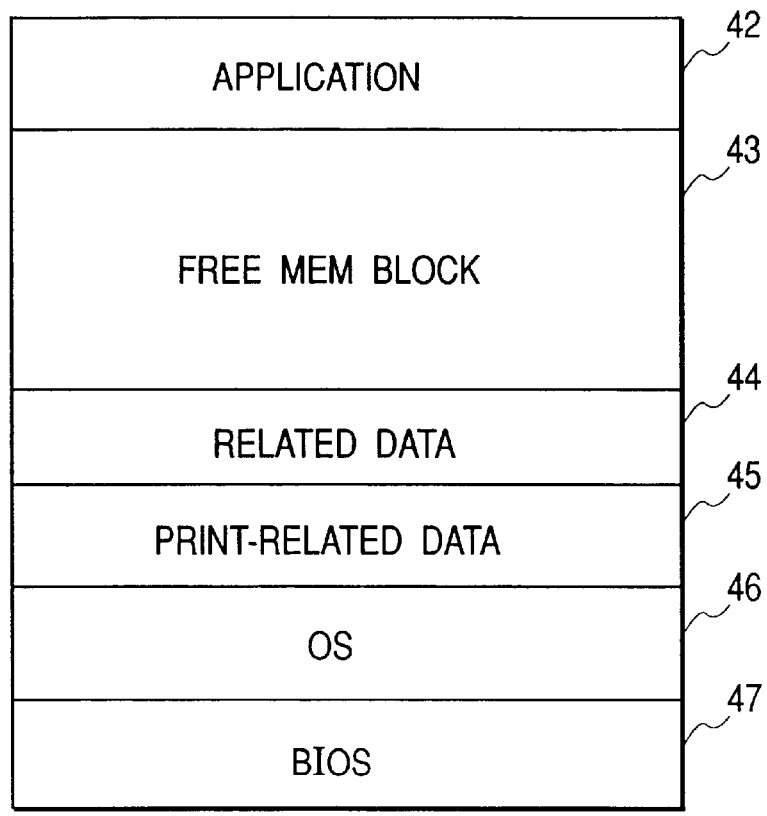
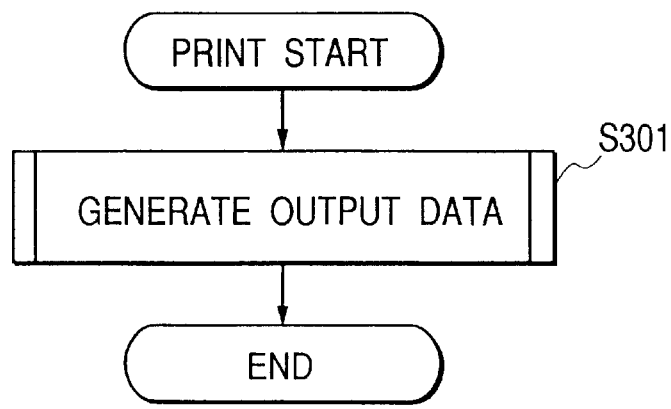

FIG. 16

|  | COLOR | LINE WIDTH |
|---|---|---|
| 1ST DRAWING PROCESS | BLUE | 1 |
| 2ND DRAWING PROCESS | RED | 1 |
| 3RD DRAWING PROCESS | BLUE | 1 |
| 4TH DRAWING PROCESS | RED | 2 |
| 5TH DRAWING PROCESS | BLUE | 1 |

FIG. 17

| PRIOR ART | THE PRESENT INVENTION WITHOUT TAKING DATA OUTPUT AMOUNT/ TIME DUE TO ATTRIBUTION INTO CONSIDERATION | THE PRESENT INVENTION |
|---|---|---|
|  |  |  |
| SWITCH TO BLUE | SWITCH TO LINE WIDTH 1 | SWITCH TO BLUE |
| SWITCH TO LINE WIDTH 1 | SWITCH TO BLUE | SWITCH TO LINE WIDTH 1 |
| DRAWING 1 | DRAWING 1 | DRAWING 1 |
| SWITCH TO RED | SWITCH TO RED | DRAWING 3 |
| DRAWING 2 | DRAWING 2 | DRAWING 5 |
| *SWITCH TO BLUE | *SWITCH TO BLUE | SWITCH TO RED |
| DRAWING 3 | DRAWING 3 | DRAWING 2 |
| *SWITCH TO RED | DRAWING 4 | SWITCH TO LINE WIDTH 2 |
| SWITCH TO LINE WIDTH 2 | SWITCH TO LINE WIDTH 2 | DRAWING 4 |
| DRAWING 4 | *SWITCH TO RED |  |
| *SWITCH TO BLUE | DRAWING 5 |  |
| *SWITCH TO LINE WIDTH 1 |  |  |
| DRAWING 5 |  |  |

FIG. 18

|  | TYPE STYLE | CHR CODE |
|---|---|---|
| 1ST DRAWING | TYPE STYLE 1 | CHR CODE 1 |
| 2ND DRAWING | TYPE STYLE 2 | CHR CODE 1 |
| 3RD DRAWING | TYPE STYLE 1 | CHR CODE 1 |
| 4TH DRAWING | TYPE STYLE 2 | CHR CODE 2 |
| 5TH DRAWING | TYPE STYLE 1 | CHR CODE 1 |

FIG. 19

| PRIOR ART | THE PRESENT INVENTION |
|---|---|
|  |  |
| SWITCH TO TYPE STYLE 1 | SWITCH TO TYPE STYLE 1 |
| SWITCH TO CHR CODE 1 | SWITCH TO CHR CODE 1 |
| DRAWING 1 | DRAWING 1 |
| SWITCH TO TYPE STYLE 2 | DRAWING 3 |
| DRAWING 2 | DRAWING 5 |
| SWITCH TO TYPE STYLE 1 | SWITCH TO TYPE STYLE 2 |
| DRAWING 3 | DRAWING 2 |
| SWITCH TO TYPE STYLE 2 | SWITCH TO CHR CODE 2 |
| SWITCH TO CHR CODE 2 | DRAWING 4 |
| DRAWING 4 |  |
| SWITCH TO TYPE STYLE 1 |  |
| SWITCH TO CHR CODE 1 |  |
| DRAWING 5 |  |

IMAGE DRAWING APPARATUS, IMAGE DRAWING METHOD AND MEMORY MEDIUM

BACKGROUND OF THE INVENTION

1. Field of the Invention

The present invention relates to an image drawing apparatus for changing data entered from an application program or the like into a form suitable for processing in an output device such as a printer, an image drawing method and a memory medium therefor.

2. Related Background Art

In the PDL (page description language), in case of drawing and printing data such as lines or characters, it is necessary to switch the drawing attributes, such as color or line width in case of a line, or font or size in case of a character, in order to output the drawn data. Conventionally the output data of the drawn image have been generated by switching such drawing attributes in the order of input of the requests for drawing.

However, in such conventional method of generating the drawn output data in the order of input of the requests for drawing, the switching of the drawing attributes such as color, line width, font etc. becomes frequent, thus leading to a lowered hit rate of the font cache in the printer and a lowered throughput of printing, also leading to an increase in the amount of output data resulting from the frequent switching of such drawing attributes, thereby eventually resulting in a loss in the resolving power and in the image quality and in a defective printing.

SUMMARY OF THE INVENTION

In consideration of the foregoing, the object of the present invention is to reduce the frequency of switching of the drawing attributes.

The above-mentioned object can be attained, according to the present invention, by analyzing the input data, then changing the order of drawing of the input data in such a manner that the result of drawing remains same as in the case of drawing the input data in the order of input and that the switching of the drawing attributes does not increase, and outputting the data of thus changed drawing order to the output device.

BRIEF DESCRIPTION OF THE DRAWINGS

FIG. 2 is a memory map in a state in which a print-related module including an automatic logic drawing program, constituting an embodiment of the present invention, is loaded in a RAM of an information processing apparatus and is rendered operable;

FIG. 3 is a flow chart showing the outline of an automatic attribute classifying/drawing process;

FIG. 16 is a view showing a first example of drawing request data;

FIG. 17 is a view showing drawing output data corresponding to the example of the data shown in FIG. 14;

FIG. 18 is a view showing a second example of drawing request data; and

FIG. 19 is a view showing drawing output data corresponding to the example of the data shown in FIG. 16.

DETAILED DESCRIPTION OF THE PREFERRED EMBODIMENTS

Now the present invention will be clarified in detail by examples thereof, with reference to the attached drawings.

Figure 1:
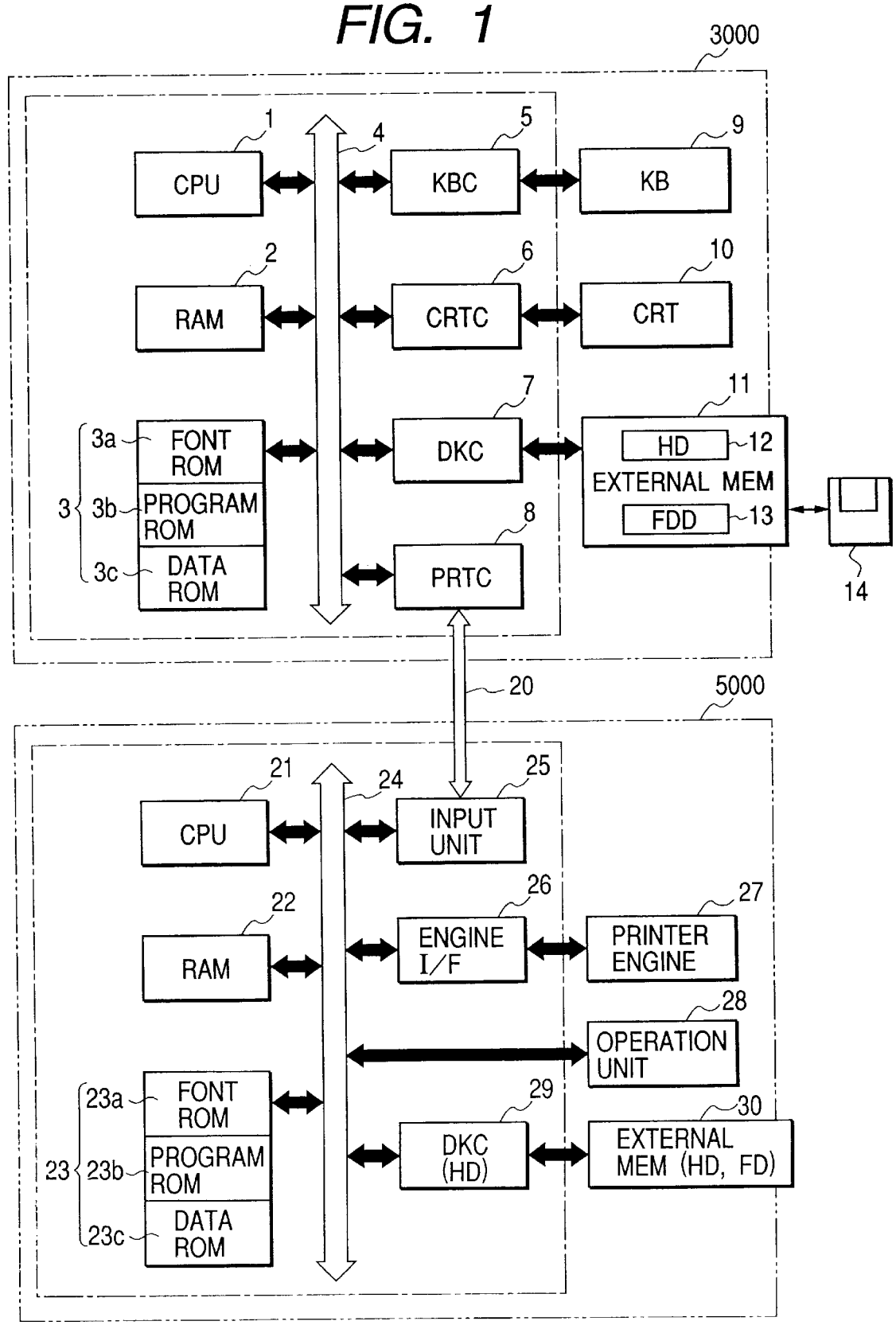
FIG. 1 is a schematic block diagram of an automatic logic drawing apparatus embodying the present invention.

FIG. 1 is a schematic block diagram of an automatic logic drawing apparatus constituting an embodiment of the present invention. The present invention is naturally applicable to a single equipment, a system consisting of plural equipment, or a system connected through a network such as LAN or WAN and executing process therethrough, as long as the functions of the present invention can be attained.

Referring to FIG. 1, a host computer 3000 is provided with a CPU 1 which executes document processing, containing graphics, images, characters, tables (including table calculation) etc., according to a document processing program stored in a program ROM 3b in a ROM 3. The CPU 1 executes the document processing by comprehensively controlling the devices connected to a system bus 4.

The program ROM 3b of the ROM 3, or an external memory 11 stores an operating system program (hereinafter represented as OS) which is a control program for the CPU 1, while a font ROM 3a of the ROM 3 or the external memory 11 stores the font data to be used in the document processing, and a data ROM 3c of the ROM 3 or the external memory 11 stores various data (such as directory information, printer driver table etc.) to be used in the document processing. In this case, the main body of control on hardware is constituted by the CPU 1, while that on software is constituted by the print-related module including the present automatic logic drawing program.

There are also provided a RAM 2 functioning as a main memory and a work area for the CPU 1; a keyboard controller (KBC) 5 for controlling the key input from a keyboard (KB) 9 or an unrepresented pointing device; a CRT controller (CRTC) 6 for controlling the display on a CRT display (CRT) 10; a disk controller (DKC) 7 for controlling the access to the external memory 11 such as a hard disk (HD) 12 or a floppy disk (FD) 14 set in a floppy disk drive (FDD) 13 for storing a boot program, various application programs, font data, user files, editing files, the automatic logic drawing program etc.; and a printer controller (PRTC)

8 connected to a printer 5000 through a predetermined bidirectional interface 20 for executing communication control with the printer 5000. The CPU 1 executes, on the display information RAM set on the RAM 2, development into an outline font (rasterization) thereby enabling WYSIWYG (what you see is what you get) on the CRT 10. Also the CPU 1 opens various windows registered in advance, according to commands instructed for example by an unrepresented mouse cursor on the CRT 10, thereby executing various data processing.

In the printer 5000, a printer CPU 21 supplies printer engine 27 connected to the system bus 24 with an image signal as the output information, based on a control program stored in a program ROM 23b in a ROM 23 or in an external memory 30. A font ROM 23a of the ROM 23 stores font data to be used in the generation of the above-mentioned output information, and a data ROM 23c of the ROM 23 stores information to be used in the host computer 3000, in case the printer is not equipped with the external memory 30 such as a hard disk. The CPU 21 is capable of communication with the computer 3000 through an input unit 25, and the information in the printer 5000 is transmitted to the host computer 3000 under the control of the CPU 21. A RAM 22 functions as a main memory and a work area of the CPU 21, and is so constructed that the memory capacity thereof can be expanded by an optional RAM connected to an unrepresented expansion port. The RAM 22 is utilized as an output information development area, an environmental data storage area, an NVRAM etc. The external memory 30 such as a hard disk (HD) or an IC card is access controlled by a disk controller (DKC) 29. The external memory 30 is connected as an option and is used for storing font data, emulation programs, form data etc. An operation panel 28 is provided with operating switches, LED displays etc.

The external memory mentioned above is not limited to one unit, but there may be connected plural external memories for storing optional fonts in addition to the internally stored font, or a program for interpreting a printer control language of a different language system. There may also be provided an unrepresented NVRAM for storing printer mode setting information entered from the operation panel 28.

In the following there will be explained the automatic attribute classifying/drawing process featuring the present invention, with reference to flow charts shown in FIGS. 3 to 13.

A program corresponding to the flow charts shown in FIGS. 3 to 13 is stored as a module including the automatic logic drawing program in the HD 12 or FD 14 of the host computer 3000, and the CPU 1 attains the functions of the present invention by executing such program under the management of the operating system.

Referring to FIG. 2, when the power supply of the host computer 3000 is turned on, based on the IPL (initial program loading) function in a BIOS (basic input output system) program stored in the program ROM 3b, the OS 46 is loaded from the HD 12 to the RAM 2 whereupon the function of the OS 46 is initiated. FIG. 2 is a memory map in a state in which the print-related module including the automatic logic drawing program, embodying the present invention, is loaded in the RAM 2 of the host computer 3000 and is rendered operable.

The print-related module including the automatic logic drawing program is however rendered operable in practice by setting the floppy disk 14, storing the print-related module, in the floppy disk drive 13 or storing the print-related module in the hard disk 12, loading the print-related module from the FD 14 or the HD 12 into the RAM 2 under the control of the OS 46 and the BIOS 47, and when a printing process is executed by an application 46 function on the host computer 3000 under the management of the OS 46 in response to an instruction by the user.

Figure 15:
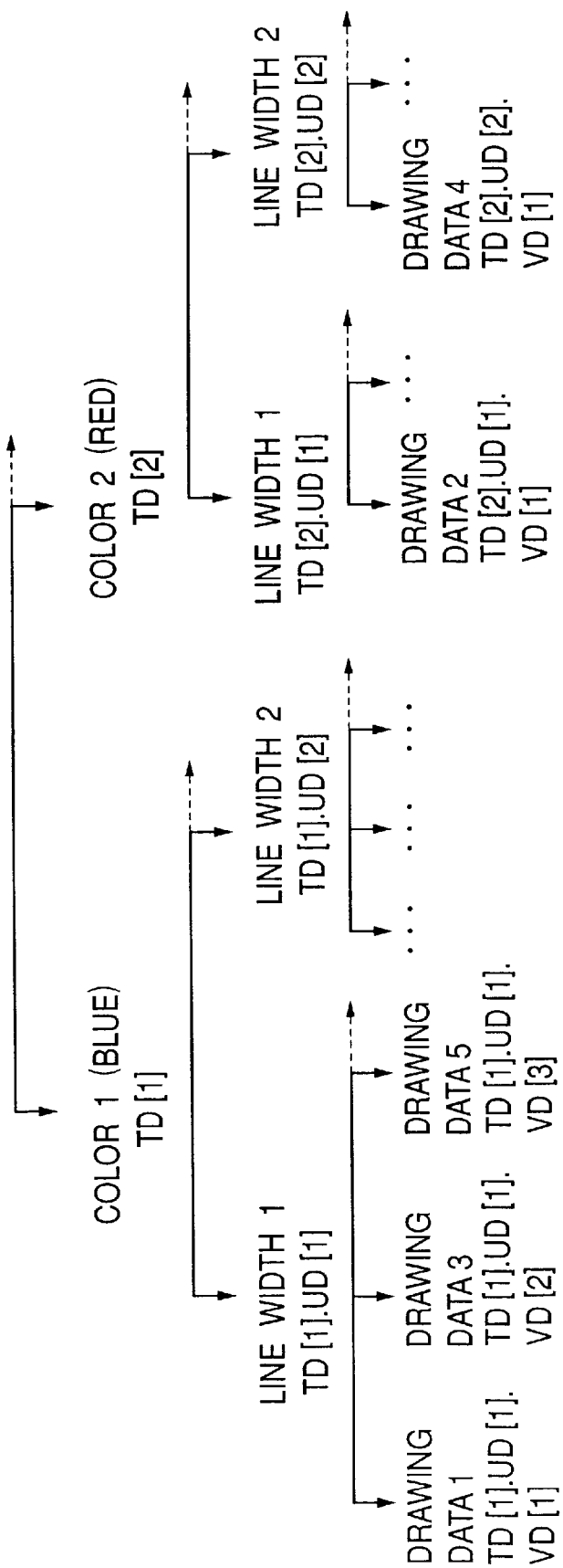
FIG. 15 is a schematic view showing the method of attribute classification.

The automatic attribute classifying/drawing process classifies and groups the drawing data supplied from the application according to the drawing attributes such as color and line width as shown in FIG. 15, and executes switching of the drawing attribute by each group, thereby reducing the number of switching of the drawing attribute and suppressing the increase in the amount of data resulting from such switching of the drawing attribute. In these operations, if there are plural drawing attributes such as color and line width, such attributes are arranged in hierarchic structure and the classification is made from the drawing attribute of the upper hierarchic layer. Also the plural drawing data with a same drawing attribute are outputted in consecutive manner, by the change of the order of input, after the switching of the drawing attribute in the unit of each group.

Figure 12:
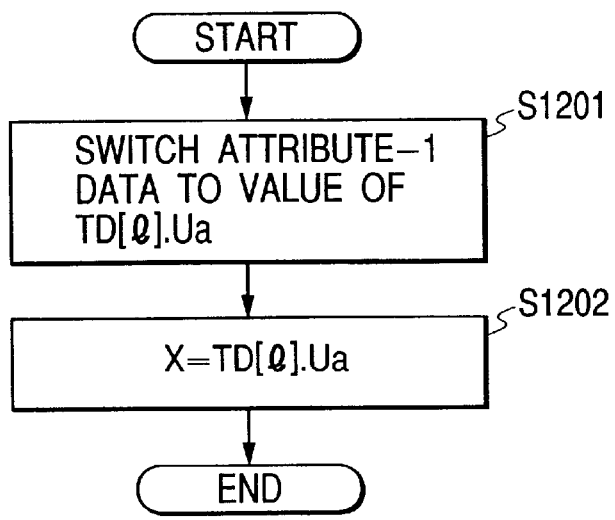
FIG. 12 is a flow chart showing the details of an attribute-1 switching process shown in FIG. 11.
Figure 13:
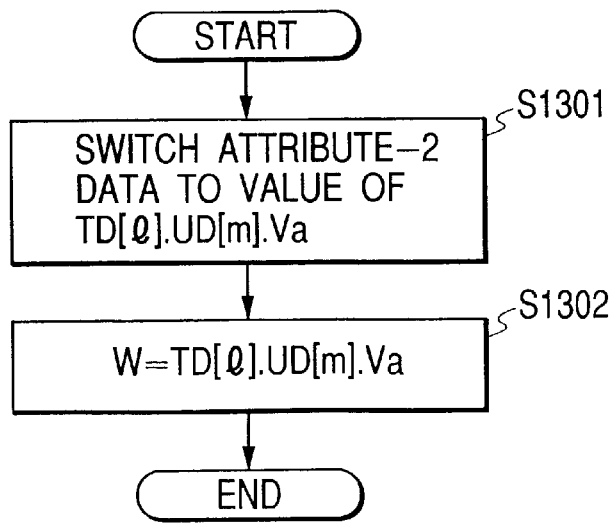
FIG. 13 is a flow chart showing the details of an attribute-2 switching process shown in FIG. 11.
Figure 14:
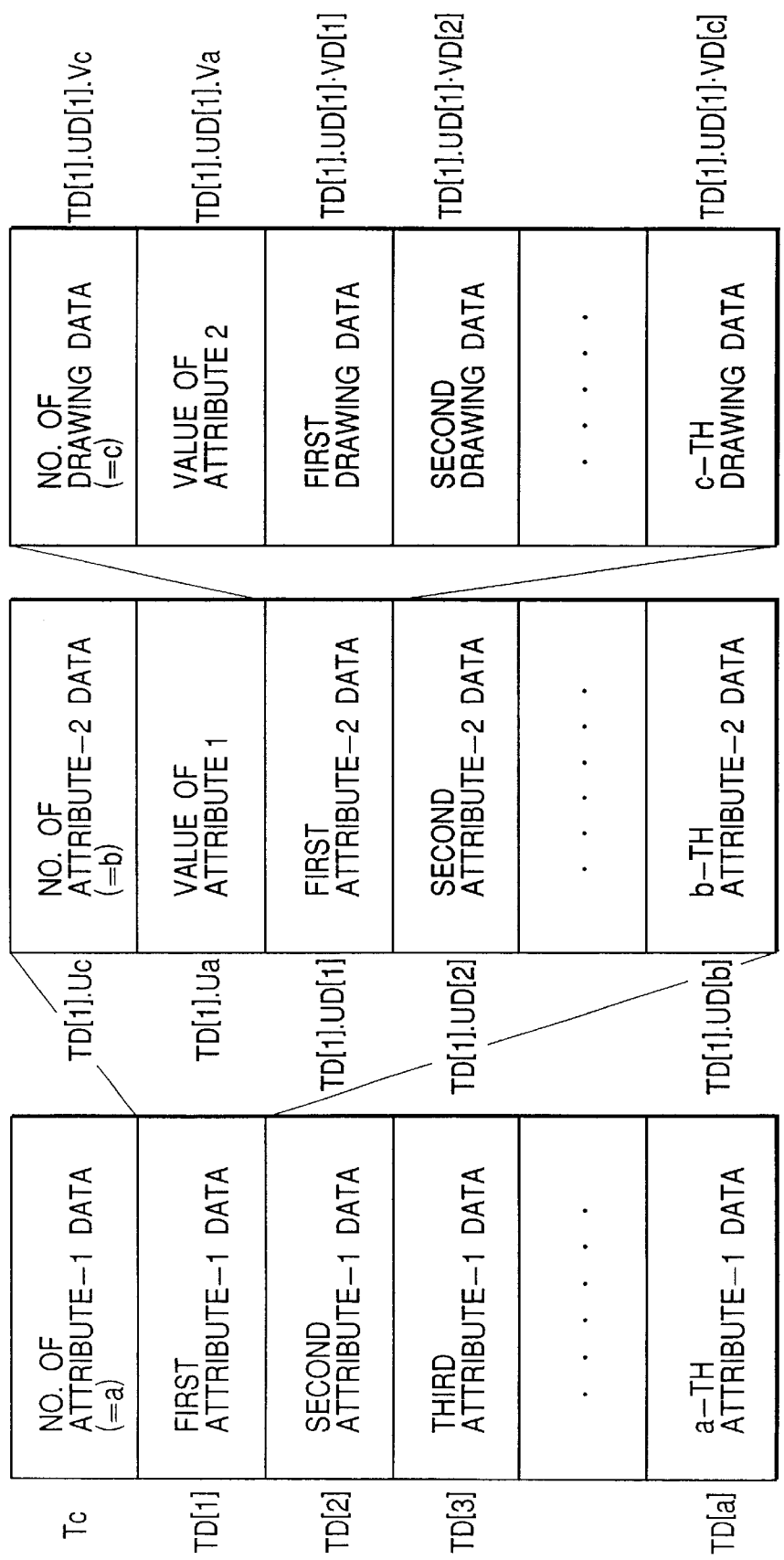
FIG. 14 is a schematic view showing the concept of the method of storage of attribute classification data.

The attribute classification data are stored in a format as shown in FIG. 14. In FIGS. 4 to 15 there are employed following symbols. The number of data of an input attribute 1 (for example number of colors if the attribute 1 is color) is represented by Tc, and the l-th data (entered l-th) of the attribute 1 is represented by TD[l].

As shown in FIG. 14, the l-th data of attribute 1 contains the number of input data of the attribute 2, the value of the attribute 1 and the data of the attribute 2 corresponding to the number of the data of the attribute 2. The number of data of the attribute 2 is represented as TD[l].Uc, while the value of the attribute 1 is represented as TD[l].Ua, and the data of the attribute 2 entered at the m-th order is presented as TD[l].UD[m].

The data of the attribute 2 entered at the m-th order contains the number of drawing data, the value of the attribute 2, and the drawing data corresponding to the number of drawing data. The number of drawing data is represented as TD[l].UD[m].Vc, while the value of the attribute 2 is represented as TD[l].UD[m].Va, and the drawing data entered at the n-th order is represented as TD[l].UD[m].VD[n].

The process flow is as outlined in FIG. 3, and is so constructed as to generate, in the execution of the printing process, output data to the printer 5000 from the print data received from the application program, namely the data processed by the application (step S301).

Figure 4:
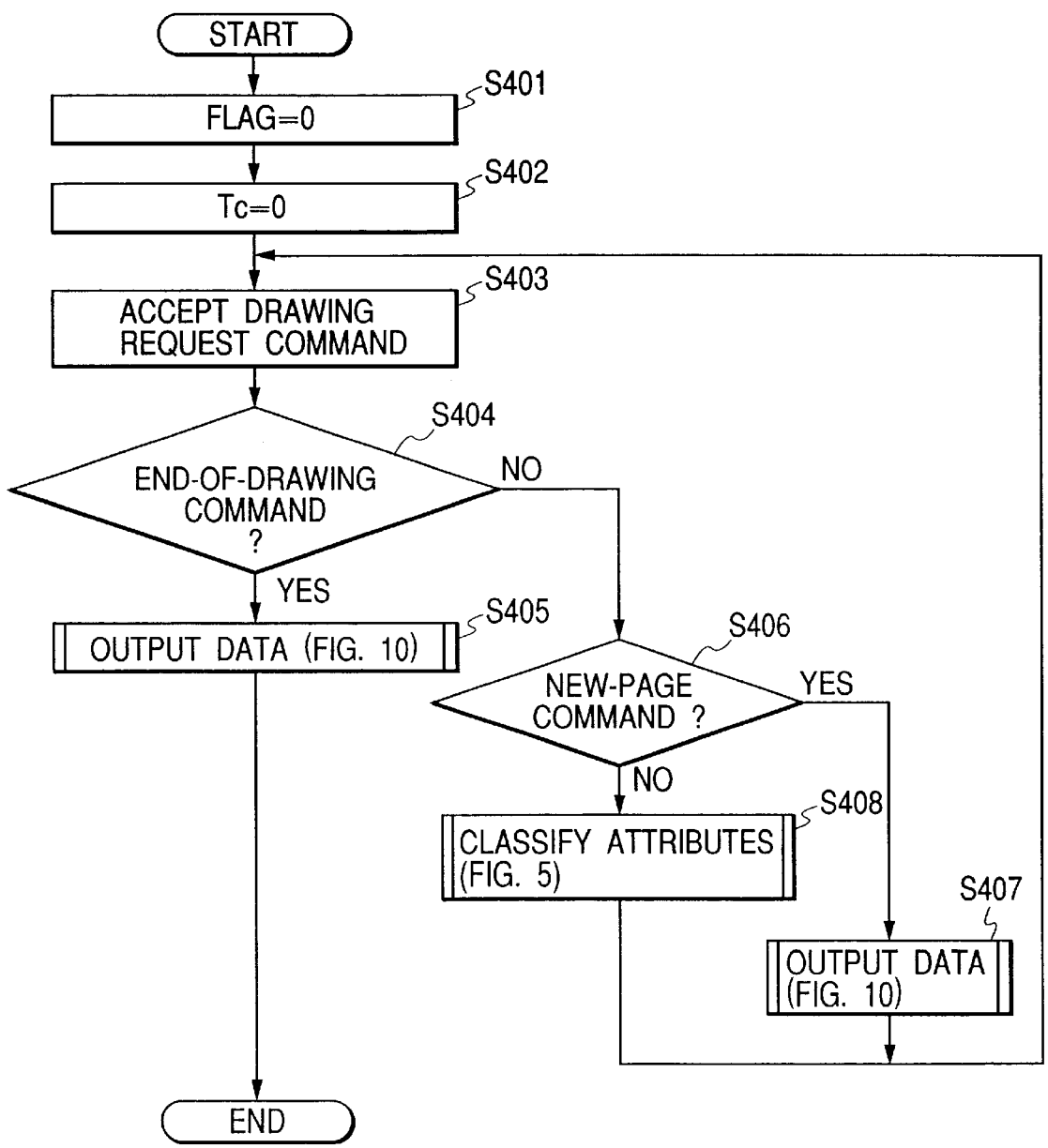
FIG. 4 is a flow chart showing the details of an output data generation process shown in FIG. 3.
Figure 10:
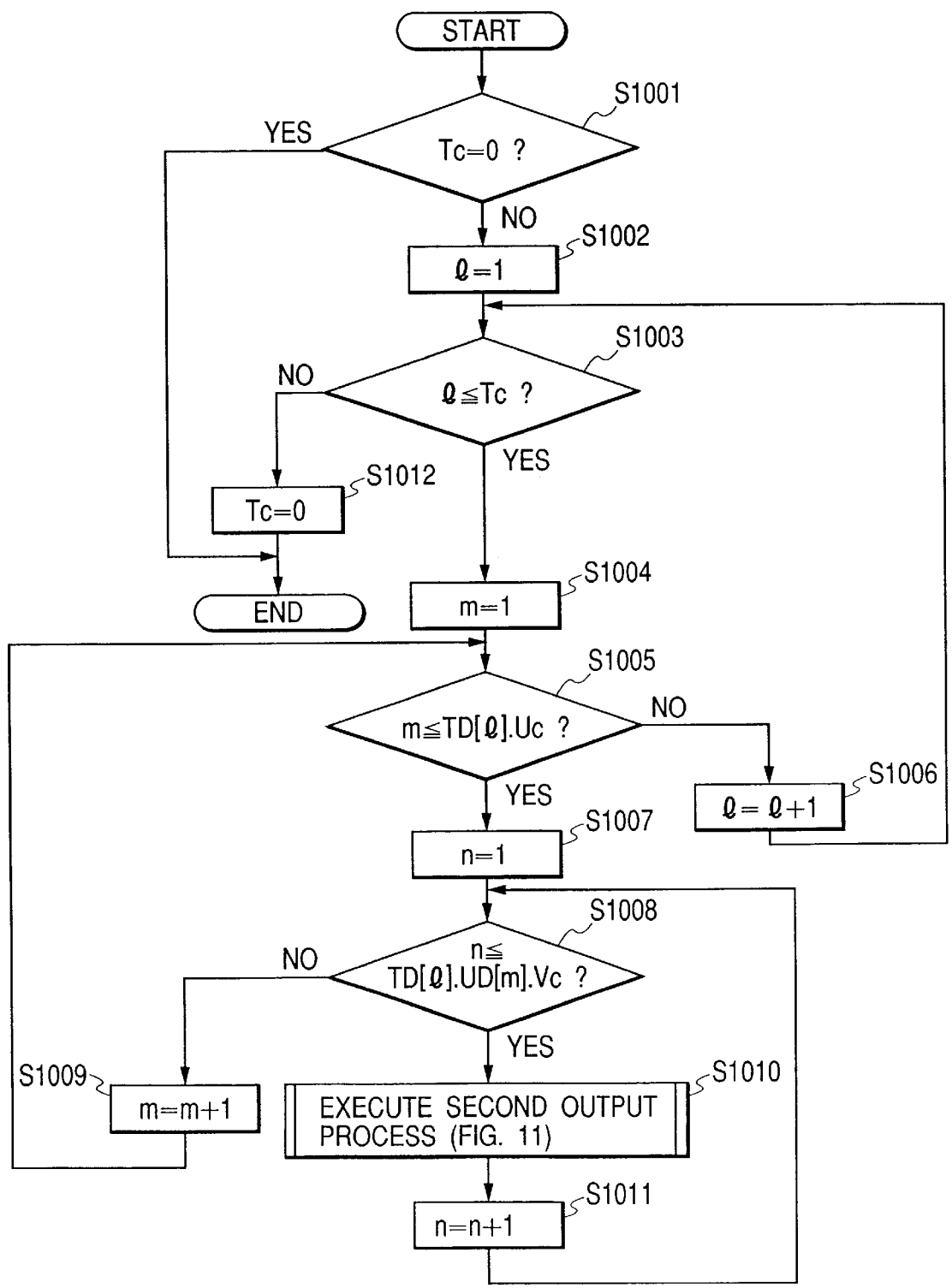
FIG. 10 is a flow chart showing the details of an output process shown in FIG. 4.

As shown in FIG. 4 is more details, at first a flat is set at 0 (step S401), and a number Tc indicating the number of data of the attribute 1 at 0 (step S402). Then a drawing process request from the application is accepted (step S403), and there is discriminated whether the drawing request is for terminating the drawing (step S404). If the accepted drawing request is for terminating the drawing, there is executed an output process (step S405) of which details are shown in FIG. 10, and the process is terminated. If the accepted drawing request is not for terminating the drawing, there is discriminated whether the drawing request is for renewing the page (step S406). If the request is for renewing the page, there is executed the output process shown in FIG. 10 (step S405) and the sequence returns to the step S403. If the request is not for renewing the page, there is executed an attribute classifying process (step S408) of which details are shown in FIG. 5 and the sequence returns to the step S403.

Figure 5:
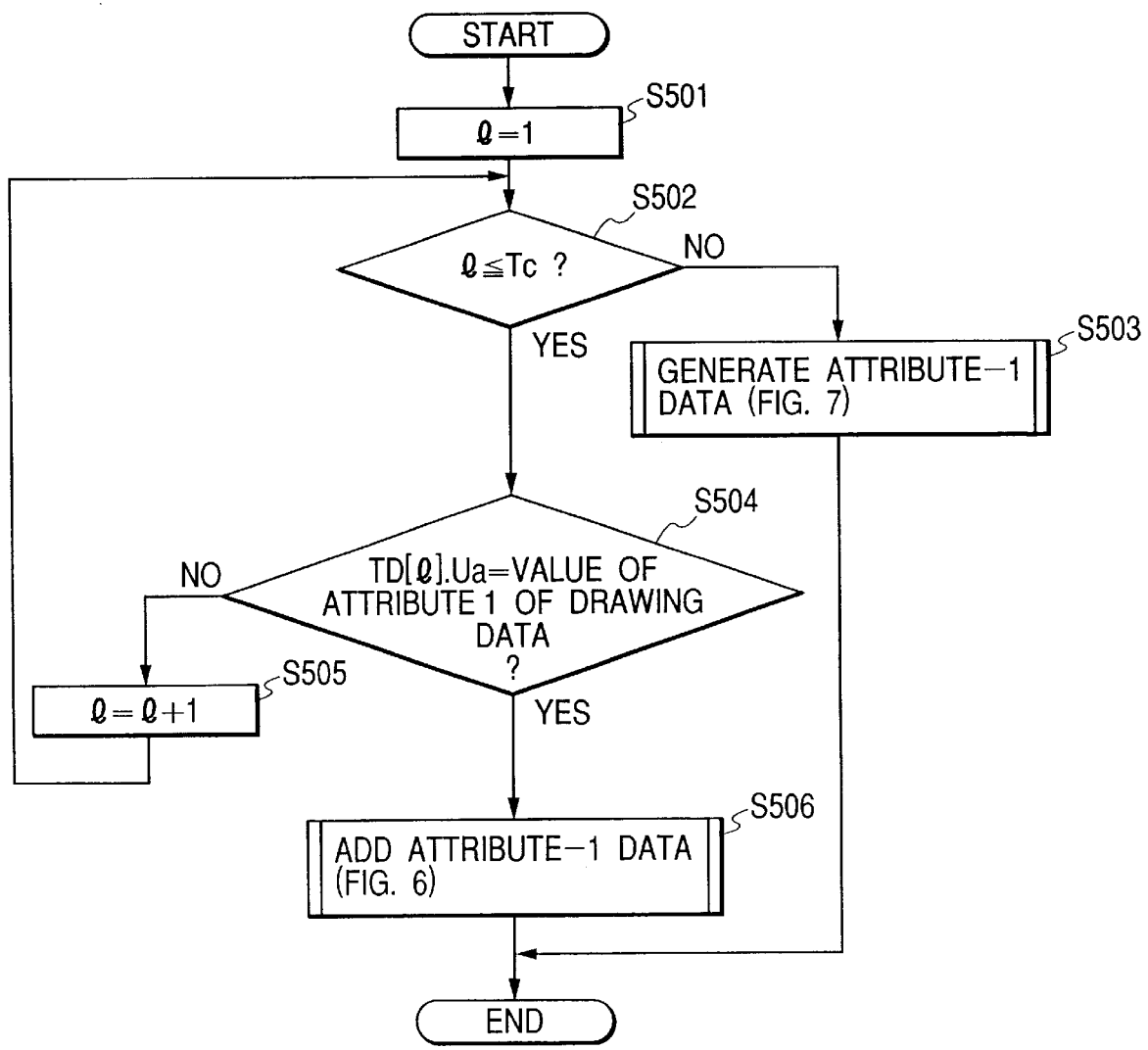
FIG. 5 is a flow chart showing the details of an attribute classifying process shown in FIG. 4.
Figure 6:
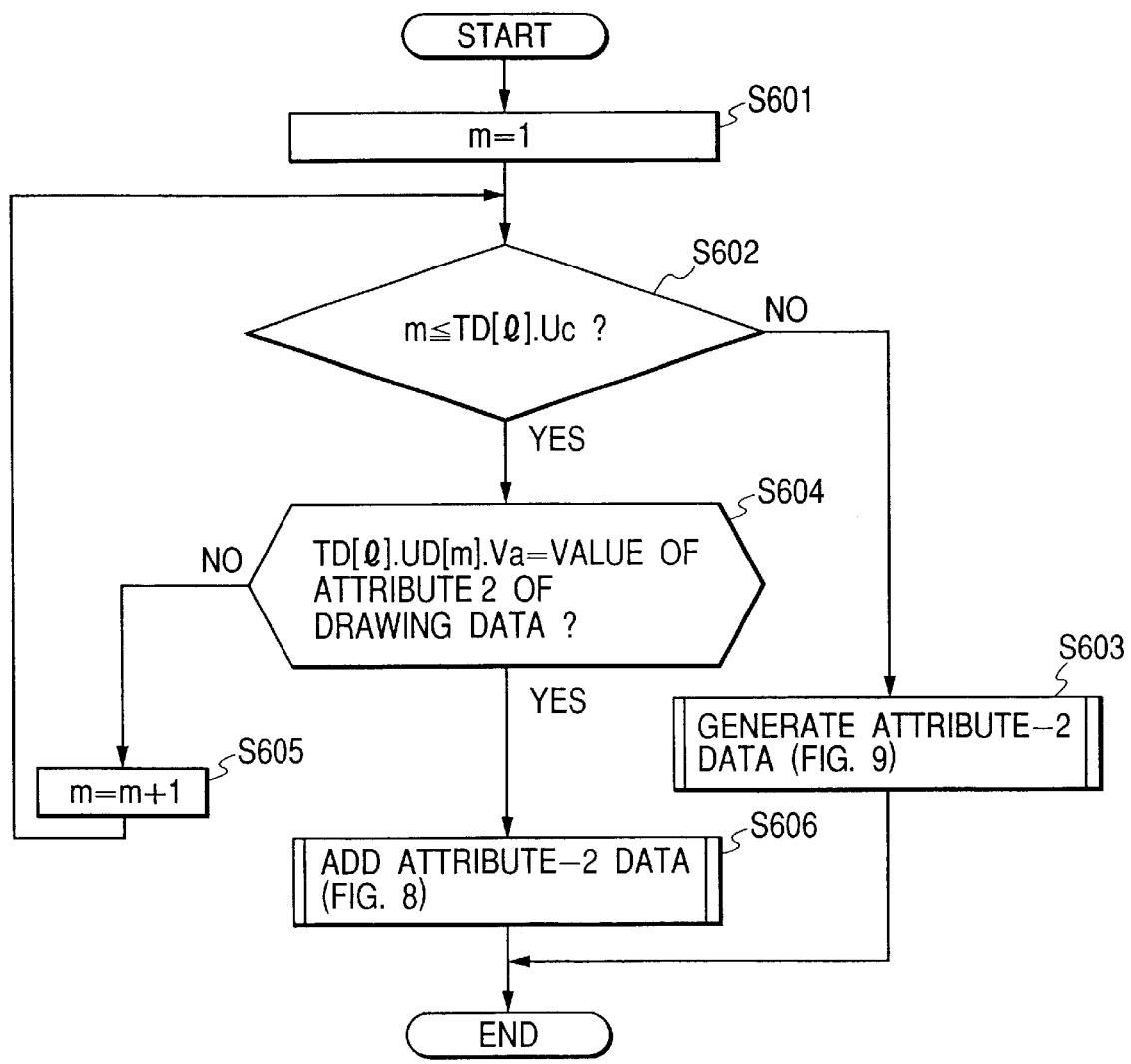
FIG. 6 is a flow chart showing the details of an attribute-1 data adding process shown in FIG. 5.
Figure 7:
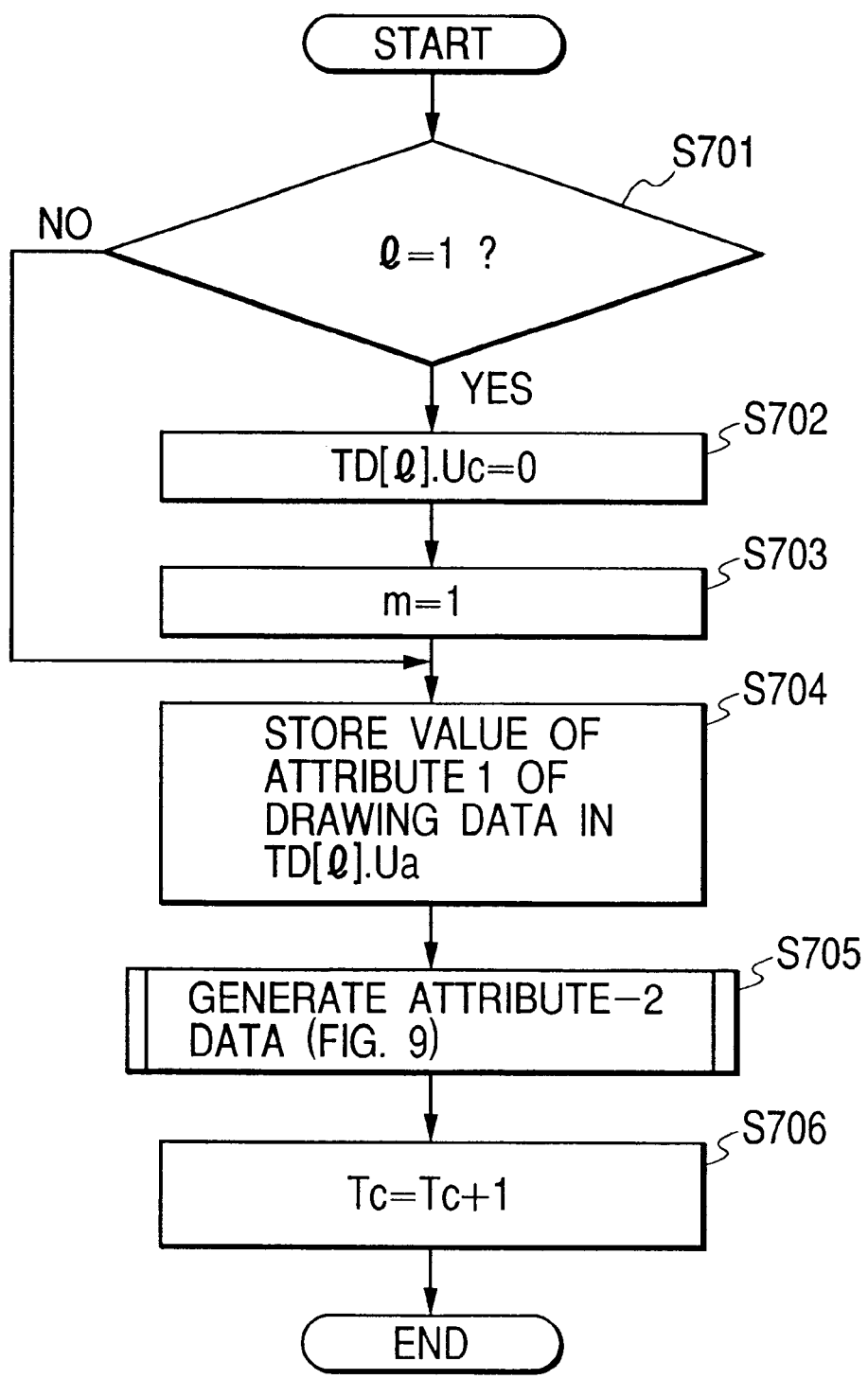
FIG. 7 is a flow chart showing the details of an attribute-1 data generation process shown in FIG. 5.

The attribute classifying process is shown in FIG. 5. At first a variable l is set at 1 (step S501), and there is discriminated whether the variable l does not exceed Tc (number of the attribute-1 data) (step S502). If the variable l exceeds Tc, there is executed an attribute-1 data preparation process (step S503) of which details are shown in FIG. 7, and the sequence is terminated. If the variable l does not exceed Tc, there is discriminated whether TD[l].Ua representing the value of attribute of the l-th attribute-1 data is equal to the value of the drawing data of the currently accepted drawing request (step S504), and, if they are different, signifying the entry of the drawing data of a new attribute 1, the variable l is increased by 1 (step S505), and the sequence returns to the step S502. If the value of TD[l].Ua is equal to the value of the attribute 1 of the current drawing data, signifying that the drawing data of a same attribute 1 has already been entered, there is executed an attribute-1 data addition process (step S506) of which details are shown in FIG. 6, and the sequence is terminated. In the discrimination of the step S504 for the identify of the attribute 1, the drawing data not having the corresponding attribute 1 (for example color) is identified as lacking such attribute 1. The discrimination is executed in a similar manner in the following description.

The details of the attribute-1 data generation process are shown in FIG. 7. At first there is discriminated whether the variable l is 1 (step S701), and, if not, the sequence proceeds to a step S704. If the variable l is 1, the value of TD[l].Uc, representing the number of the attribute-2 data contained in the l-th attribute-1 data, is set at 0 (step S702). Then a variable m is set at 1 (step S703) and the sequence proceeds to the step S704.

A step S704 stores the value of the attribute 1 of the current drawing data in TD[l].Ua representing the attribute 1 of the attribute-2 data contained in the l-th attribute-1 data. Then there is executed an attribute-2 data generation process (step S705) of which details are shown in FIG. 9, then Tc is increased by 1 (step S706) and the sequence is terminated.

Figure 9:
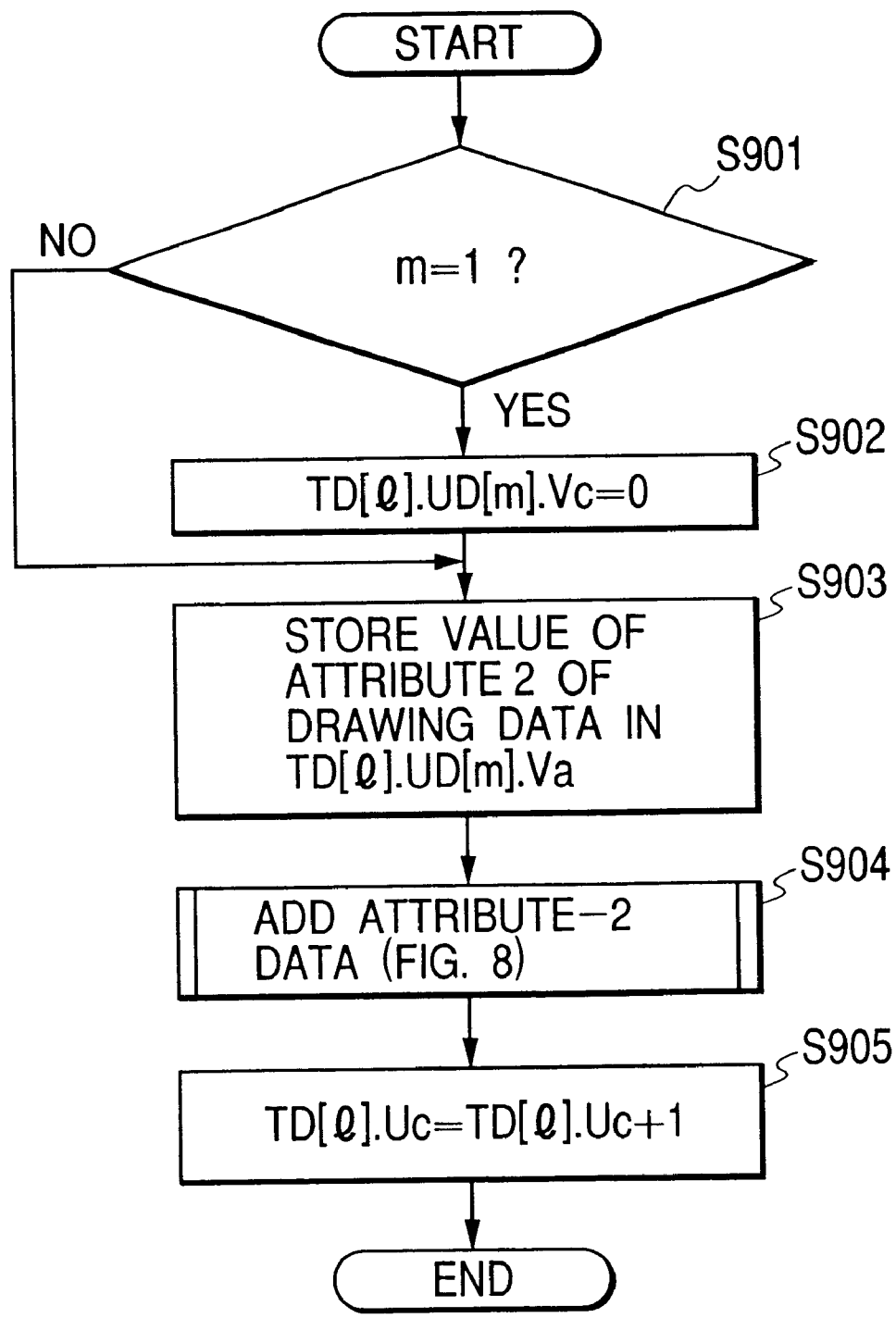
FIG. 9 is a flow chart showing the details of an attribute-2 data generation process shown in FIG. 6.

The details of the attribute-2 data generation process are shown in FIG. 9. At first there is discriminated whether a variable m is 1 (step S901), and, if not, the sequence process to a step S903. If the variable m is 1, TD[l].UD[m].Vc indicating the number of the drawing data in the m-th attribute-2 in the l-th attribute-1 data is set at 0 (step S902), and the sequence proceeds to a step S903.

A step S903 stores the value of the attribute 2 of the current drawing data in TD[l].UD[m].Va representing the attribute 2 of the drawing data in the m-th attribute-2 in the l-th attribute-1 data. Then there is executed an attribute-2 data adding process (step S904) of which details are shown in FIG. 8, and TD[l].Uc representing the number of the attribute-2 data contained in the l-th attribute-1 data is increased by 1 (step S905) and the sequence is terminated.

Figure 8:
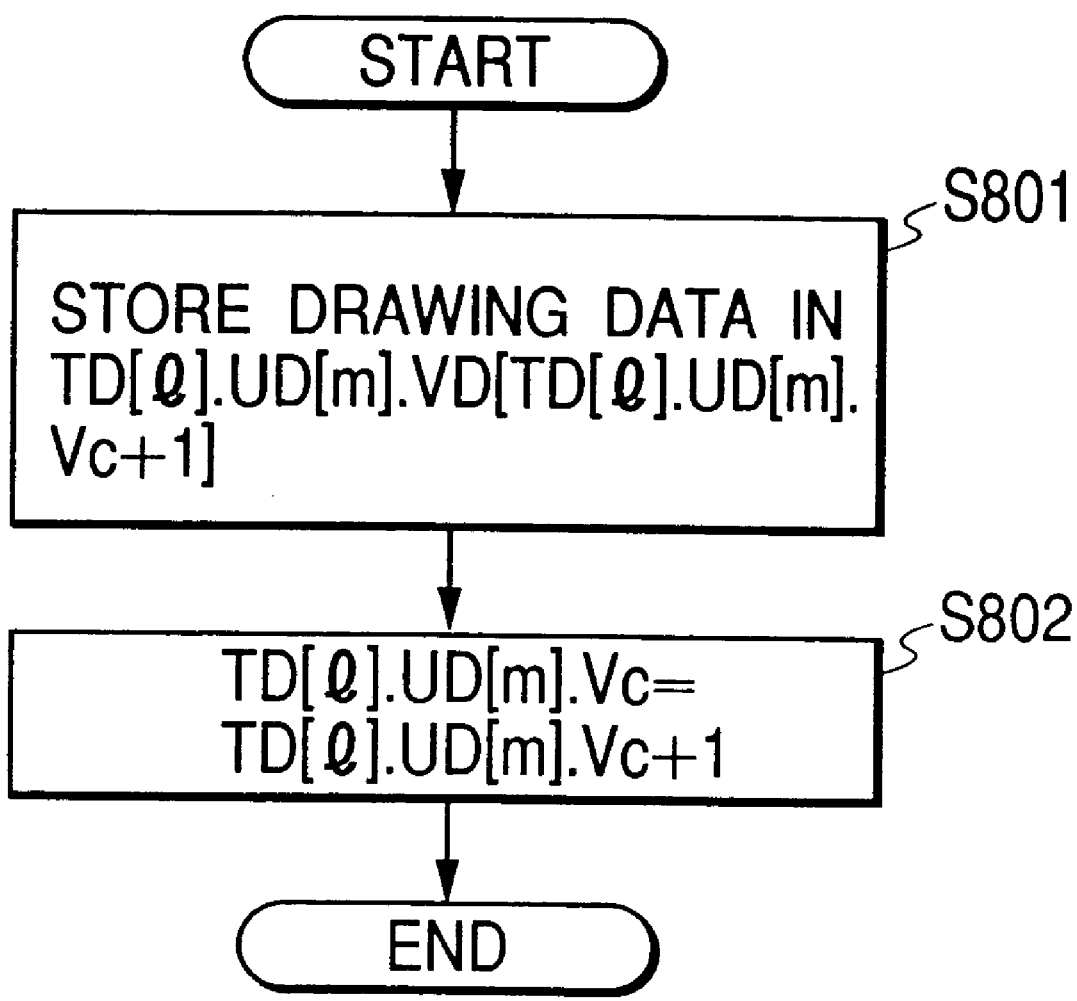
FIG. 8 is a flow chart showing the details of an attribute-2 data adding process shown in FIG. 6.

The details of the attribute-2 data addition process are shown in FIG. 8. At first the current drawing data is stored under a name TD[l].UD[m]VD[n] at a position TD[l].UD[m].Vc+1 in the m-th attribute-2 data contained in the l-th attribute-1 data (step S801). TD[l].UD[m].Vc indicates the number of the drawing data contained in the m-th attribute-2 data in the l-th attribute-1 data, and n in TD[l].UD[m].VD[n] corresponds to TD[l].UD[m].Vc+1. Then TD[l].UD[m].Vc is increased by 1 (step S802) and the sequence is terminated.

The details of the attribute-1 data addition process are shown in FIG. 8. At first the variable m is set at 1 (step S601), and there is discriminated whether the variable m does not exceed TD[l].Uc (number of attribute-2 data) (step S602). If the variable m exceeds TD[l].Uc, there is executed the aforementioned attribute-2 data generation process shown in FIG. 9 (step S603) and the sequence is terminated. If the variable m does not exceed TD[l].Uc, there is discriminated whether TD[l].UD[m].Va representing the value of the attribute 2 of the drawing data contained in the m-th attribute-2 data in the l-th attribute-1 data is equal to the value of the attribute 2 of the current drawing data (step S604). If the values of the attribute 2 are different, the variable m is increased by 1 (step S605) and the sequence returns to the step S602. If the values of the attribute 2 are same, there is executed the aforementioned attribute-2 data addition process shown in FIG. 8 (step S606), and the sequence is terminated.

The details of the output process in the steps S404, S407 in FIG. 4 are shown in FIG. 10. At first there is discriminated whether Tc (number of attribute-1 data) is 0 (step S1001). If Tc is 0, the sequence is terminated. If Tc is not 0, the variable l is set at 1 (step S1002) and there is discriminated whether the variable l exceeds Tc (step S1003). If the variable l exceeds Tc, Tc is set at 0 (step S1012) and the sequence is terminated. If the variable l does not exceed Tc, the variable m is set at 1 (step S1004), and there is discriminated whether the variable m exceeds TD[l].Uc (number of attribute-2 data). If the variable m exceeds TD[l].Uc, the variable l is increased by 1 (step S1006) and the sequence returns to the step S1003.

If the variable m does not exceed TD[l].Uc, the variable n is set at 1 (step S1007), and there is discriminated whether the variable n exceeds TD[l].UD[m].Vc (number of drawing data) (step S1007). If the variable n is larger, the variable m is increased by 1 (step S1009) and the sequence returns to the step S1005. If the variable n is not larger, there is executed an output process-2 (step S1010) of which details are shown in FIG. 11, then the variable n is increased by 1 (step S1011) and the sequence returns to the step S1008.

Figure 11:
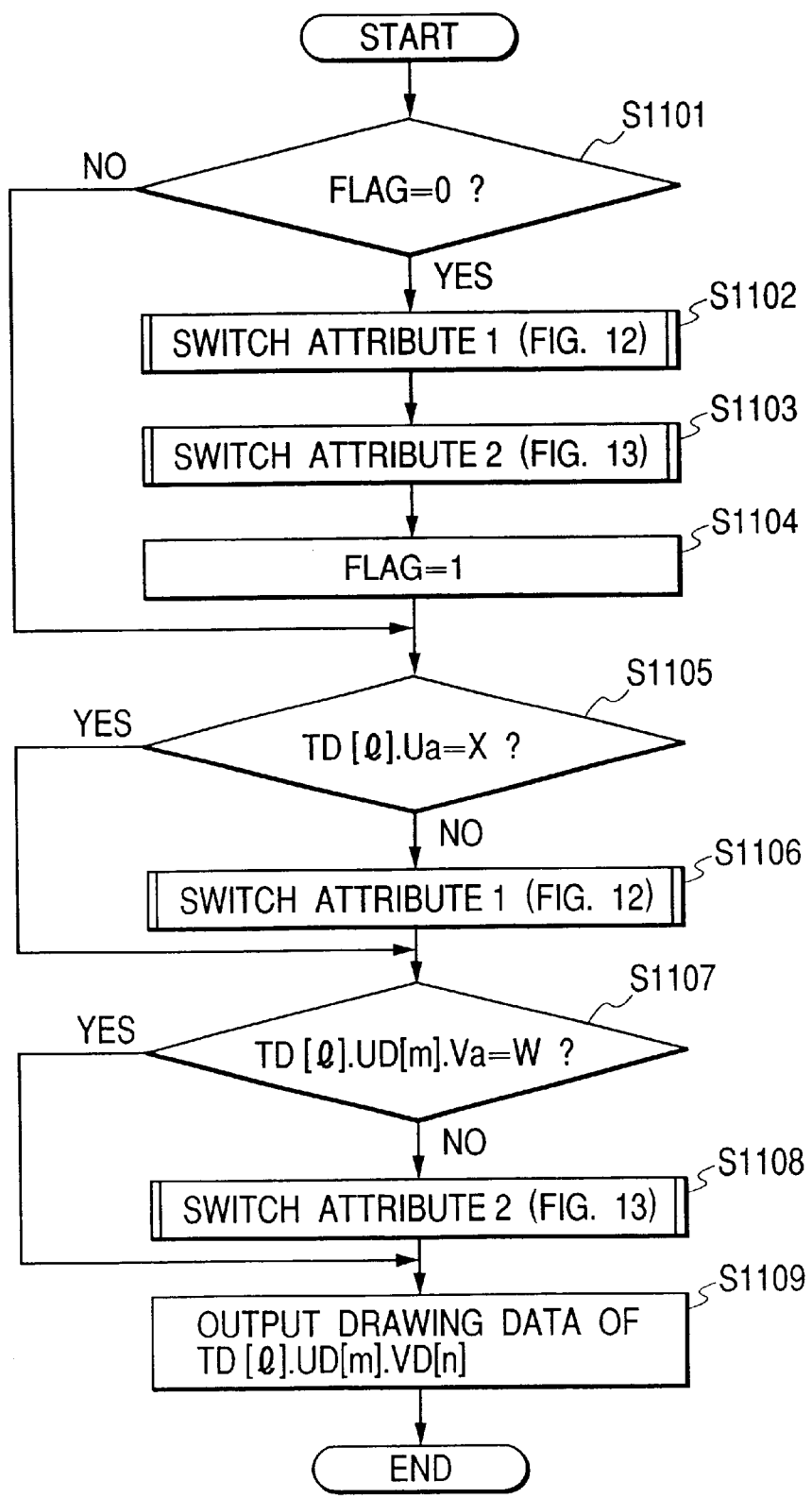
FIG. 11 is a flow chart showing the details of an output-2 process shown in FIG. 10.

The details of the output process-2 are shown in FIG. 11. At first there is discriminated whether a flag is 0 (step S1101), and, if not, the sequence proceeds to a step S1105. If the flag is 0, there is executed an attribute-1 switching output process (step S1102) of which details are shown in FIG. 12. Then there is executed an attribute-2 switching output process (step S1103) of which details are shown in FIG. 13, and the flag is set at 1 (step S1104) and the sequence proceeds to a step S1105.

A step S1105 discriminates whether TD[l].Ua representing the value of the attribute 1 is equal to X (value of attribute 1) shown in FIG. 12, and, if the values of the attribute 1 are same, the sequence proceeds to a step S1007, but, if they are different, there is executed an attribute-1 switching output process shown in FIG. 12 (step S1106) and the sequence proceeds to a step S1107. A step S1107 discriminates whether TD[l].UD[m].Va representing the value of the attribute 2 is equal to W (value of attribute 2) shown in FIG. 13. If the values of the attribute 2 are same, the sequence is terminated, but, if they are different, there is executed an attribute-2 switching output process (step S1108). Then there is outputted drawing data represented by TD[l].UD[m].VD[n] (step S1309) and the sequence is terminated.

The details of the attribute-1 switching output process are shown in FIG. 12. The attribute-1 data are outputted by switching to the value of TD[l].Ua (step S1201), then TD[l].Va representing the attribute-1 data is stored at X (step S1202) and the sequence is terminated.

The details of the attribute-2 switching output process are shown in FIG. 13. The attribute-2 data are outputted by switching to the value of TD[l].UD[m].Va (step S1301), then TD[1].UD[m].Va representing the attribute-2 data is stored at W (step S1302) and the sequence is terminated.

In case the above-described automatic attribute classifying/drawing process is applied to the drawing data shown in FIG. 16 and FIG. 18, there is obtained an output as shown in FIG. 17. In the example shown in FIG. 16, the switched output of color requires 5 bytes while the switched output of line width requires 3 bytes, while the processing apparatus receiving such output requires 5 seconds for switching of the color and 3 seconds for switching of the line width. In consideration of the amount of the output attribute data relating to such switching and the time required for switching, color is selected as the attribute 1 and line width is selected as the attribute 2 so as to reduce the amount of the output attribute data and also reduce the processing time. Stated differently, the color is selected as an upper hierarchic layer than the line width, so that the classification by color is executed prior to the classification by line width.

FIG. 17 shows not only the output status of the present example in which the color and the line width are respectively selected as the attribute 1 and the attribute 2, but also the output status in the prior art and that of the present example in which the attributes are divided into the hierarchic layers not in consideration of the output data amount/process time by the attributes (namely in case the line width is selected as the attribute 1 and the color is selected as the attribute 2), wherein portions marked with * are superfluous in comparison with the present example with the color selected as the attribute 1 and the line width selected as the attribute 2.

As shown in FIG. 17, the present example with the color and the line width respectively selected as the attribute 1 and the attribute 2 reduces the number of switching of the attribute, whereby the amount of the output attribute data is reduced by 18 bytes in comparison with the prior art, and by 10 bytes in comparison with the case in which the output data amount/process time are not considered. Also the process time in the processing apparatus receiving such output data is reduced by 18 seconds in comparison with the prior art and by 10 seconds in comparison with the case in which the output data amount/process time are not considered.

Also the present example enables efficient utilization of the cache memory in the processing apparatus receiving the output data. As an example, let us consider a case of entering the drawing data shown in FIG. 16, where the font and the character code are the attributes for re-utilization of the data of the font cache memory. The process of the present example with the font selected as the attribute 1 and the character code selected as the attribute 2 provides an output status shown in FIG. 19, wherein it is assumed that the font cache memory can stored a character.

As shown in FIG. 19, the data in the font cache memory cannot be re-utilized in the output form of the prior art because the attribute has to be switched at each entry of the drawing data, but, in the present example, the number of switching of the attribute is reduced and the drawing data of a same attribute are supplied in succession, so that the data in the font cache memory can be re-utilized and the hit rate thereof can be improved.

As explained in the foregoing, the present example classifies and groups the data of drawing request according to the drawing attributes and executes switching of the drawing attribute by the unit of each group, whereby the frequency of switching of the drawing attribute is reduced and the increase in the amount of output data resulting from the switching of the drawing attribute is suppressed. It is thus rendered possible to improve the hit rate of the font caching in the printer and the throughput of printing, to prevent deterioration in the resolution and in the image quality, and to avoid generation of detects in printing.

The present invention is not limited by the foregoing examples. For example, the print-related module including the logic drawing program need not necessarily be stored in the hard disk or the floppy disk but can also be stored in a CD-ROM, an IC memory card or the like or acquired through a network such as electronic mail or personal computer communication. Also the above-mentioned print-related module may be preset in an internal ROM as a part of the memory map and may be directly executed by the CPU. Furthermore, the classification need not necessarily conducted on two attributes, but it may also be conducted on one attribute or three or more attributes.

Furthermore, the classification based on the attributes need not necessarily be executed in the unit of a page but may also be executed in the unit of a half page or an entire document.

As explained in the foregoing, according to the present invention there is provided a drawing process apparats for generating output drawing data, for drawing processed data, based on the drawing requests entered in succession, the apparatus comprising classification means for classifying the data of the drawing requests according to the drawing attribute, and output control means for switching the drawing attribute in the unit of classification by the classification means thereby outputting the data of a same classification in consecutive manner, whereby the frequency of switching of the drawing attribute is reduced to decrease the amount of output data and to improve the hit rate of the font caching, thereby improving the throughput of printing, and preventing deterioration in the resolution and in the image quality and also preventing generation of defects in the printing.

What is claimed is:

1. An information processing apparatus comprising:

a reception unit, adapted to receive a piece of drawing data;

a discrimination unit, adapted to discriminate whether the piece of drawing data received by said reception unit is a new-page request;

a classification unit, adapted to perform an attribute classification process for the piece of drawing data received by said reception unit, if said discrimination unit discriminates that the piece of drawing data is not a new-page request; and an output unit, adapted to arrange, based on the attribute classification process performed by said classification unit, a plurality of pieces of the received drawing data in such a sequential order that the number of attribute switching commands decreases, and output the arranged drawing data, if said discrimination unit discriminates that the piece of drawing data is a new-page request.

2. An information processing apparatus according to claim 1, wherein said output unit is adapted to change, based on the attribute classification process performed by said classification unit, the order of the plurality of pieces of drawing data by arranging the attributes in hierarchical layers.

3. An information processing apparatus according to claim 2, wherein the order of the hierarchical layers of said attributes is determined according to a switching process time of the attributes.

4. An information processing apparatus according to claim 1, wherein said output unit is adapted to arrange, based on the attribute classification process performed by said classification unit, the order of the plurality of pieces of drawing data in such a manner that objects of a same color are drawn in succession.

5. An information processing apparatus according to claim 1, wherein said output unit is adapted to arrange, based on the attribute classification process performed by said classification unit, the order of the plurality of pieces of drawing data in such a manner that patterns of a same line width are drawn in succession.

6. An information processing apparatus according to claim 1, wherein said output unit is adapted to arrange, based on the attribute classification process performed by said classification unit, the order of the plurality of pieces of drawing data in such a manner that characters of a same font are drawn in succession.

7. An information processing apparatus according to claim 6, wherein the characters of the same font are identical to one another.

8. An information processing method comprising:
   a reception step, of receiving, by a reception unit, a piece of drawing data;
   a discrimination step, of discriminating whether the piece of drawing data received in said reception step is a new-page request;
   a classification step, of performing an attribute classification process for the piece of drawing data received in said reception step, if it is discriminated in said discrimination step that the piece of drawing data is not a new-page request; and
   an output step, of arranging, based on the attribute classification process performed in said classification step, a plurality of pieces of the received drawing data in such a sequential order that the number of attribute switching commands decreases, and output the arranged drawing data, if it is discriminated in said discrimination step that the piece of drawing data is a new-page request.

9. An information processing method according to claim 8, wherein, in said output step, the order of the plurality of pieces of drawing data is changed, based on the attribute classification process performed in said classification step, by arranging the attributes in hierarchical layers.

10. An information processing method according to claim 9, wherein the order of the hierarchical layers of said attributes is determined according to a switching process time of the attributes.

11. An information processing method according to claim 8, wherein, in said output step, the order of the plurality of pieces of drawing data is arranged, based on the attribute classification process performed in said classification step, in such a manner that objects of a same color are drawn in succession.

12. An information processing method according to claim 8, wherein, in said output step, the order of the plurality of pieces of drawing data is arranged, based on the attribute classification process performed in said classification step, in such a manner that patterns of a same line width are drawn in succession.

13. An information processing method according to claim 8, wherein, in said output step, the order of the plurality of pieces of drawing data is arranged, based on the attribute classification process performed in said classification step, in such a manner that characters of a same font are drawn in succession.

14. An information processing method according to claim 13, wherein the characters of the same font are identical to one another.

15. A computer-readable memory medium storing a program to execute an information processing method, said program comprising:
   code for a reception step, of receiving, by a reception unit, a piece of drawing data;
   code for a discrimination step, of discriminating whether the piece of drawing data received in said reception step is a new-page request;
   code for a classification step, drawing data received, if it is discriminated in said discrimination step that the piece of drawing data is not a new-page request; and
   code for an output step, of arranging, based on the attribute classification process performed in said classification step, a plurality of pieces of the received drawing data in such a sequential order that the number of attribute switching commands decreases, and output the arranged drawing data, if it is discriminated in said discrimination step that the piece of drawing data is a new-page request.

16. A memory medium according to claim 15, wherein, in said output step, the order of the plurality of pieces of drawing data is changed, based on the attribute classification process performed in said classification step, by arranging the attributes in hierarchical layers.

17. A memory medium according to claim 16, wherein the order of the hierarchical layers of said attributes is determined according to the switching process time of the attributes.

18. A memory medium according to claim 15, wherein, in said output step, the order of the plurality of pieces of drawing data is arranged, based on the attribute classification process performed in said classification step, in such a manner that objects of a same color are drawn in succession.

19. A memory medium according to claim 15, wherein, in said output step, the order of the plurality of pieces of drawing data is arranged, based on the attribute classification process performed in said classification step, in such a manner that patterns of a same line width are drawn in succession.

20. A memory medium according to claim 15, wherein, in said output step, the order of the plurality of pieces of drawing data is arranged, based on the attribute classification process performed in said classification step, in such a manner that characters of a same font are drawn in succession.

21. A memory medium according to claim 20, wherein the characters of the same font are identical to one another.

22. A program product for executing an information processing method, said program product comprising:
   code for a reception step, of receiving a piece of drawing data;
   code for a discrimination step, of discriminating whether the piece of drawing data received in said reception step is a new-page request;
   code for a classification step, drawing data received, if it is discriminated in said discrimination step that the piece of drawing data is not a new-page request; and
   code for an output step, of arranging, based on the attribute classification process performed in said classification step, a plurality of pieces of the received drawing data in such a sequential order that the number of attribute switching commands decreases, and output the arranged drawing data, if it is discriminated in said discrimination step that the piece of drawing data is a new-page request.

23. A program product according to claim 22, wherein, in said output step, the order of the plurality of pieces of drawing data is changed, based on the attribute classification process performed in said classification step, by arranging the attributes in hierarchical layers.

24. A program product according to claim 23, wherein the order of the hierarchical layers of said attributes is determined according to a switching process time of the attributes.

25. A program product according to claim 22, wherein, in said output step, the order of the plurality of pieces of drawing data is arranged, based on the attribute classification process performed in said classification step, in such a manner that objects of a same color are drawn in succession.

26. A program product according to claim 22, wherein, in said output step, the order of the plurality of pieces of drawing data is arranged, based on the attribute classification process performed in said classification step, in such a manner that patterns of a same line width are drawn in succession.

27. A program product according to claim 22, wherein, in said output step, the order of the plurality of pieces of drawing data is arranged, based on the attribute classification process performed in said classification step, in such a manner that characters of a same font are drawn in succession.

28. A program product according to claim 27, wherein the characters of the same font are identical to one another.

* * * * *

UNITED STATES PATENT AND TRADEMARK OFFICE
CERTIFICATE OF CORRECTION

PATENT NO. : 6,720,970 B2
DATED : April 13, 2004
INVENTOR(S) : Nagoya

It is certified that error appears in the above-identified patent and that said Letters Patent is hereby corrected as shown below:

Title page,
Item [*] Notice, should read: -- Subject to any disclaimer, the term of this patent is extended or adjusted under 35 U.S.C. 154(b) by 0 days. --.

Signed and Sealed this

Twenty-seventh Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,720,970 B2
APPLICATION NO. : 09/158819
DATED : April 13, 2004
INVENTOR(S) : Kenji Nagoya It is certified that error appears in the above-identified patent and that said Letters Patent is hereby corrected as shown below:

ON TITLE PAGE (*) NOTICE

Insert:
--This patent issued on a continued prosecution application filed under 37 CFR 1.53(d), and is subject to the twenty year patent term provisions of 35 U.S.C. 154(a)(2).--.

COLUMN 4

Line 4, "application 46" should read --application 42--;
Line 23, "following" should read --the following--;
Line 49, "is more details," should read --in more detail,--
and "flat" should read --flag--; and
Line 61, "S405)" should read --S407)--.

COLUMN 5

Line 18, "identify" should read --identity--;
Line 39, "process" should read --proceeds--; and
Line 54, "TD[1].UD[m]VD[n]" should read --TD[1].UD[m].VD[n]--.
Line 63, "FIG. 8." should read --FIG. 6.--.

COLUMN 6

Line 57, "(step S1309)" should read --(step A1109)--.

COLUMN 7

Line 52, "stored" should read --store--.

UNITED STATES PATENT AND TRADEMARK OFFICE
CERTIFICATE OF CORRECTION

PATENT NO. : 6,720,970 B2
APPLICATION NO. : 09/158819
DATED : April 13, 2004
INVENTOR(S) : Kenji Nagoya It is certified that error appears in the above-identified patent and that said Letters Patent is hereby corrected as shown below:

COLUMN 8

Line 5, "detects" should read --defects--;
Line 16, "conducted" (first occurrence) should read -- be conducted--; and
Line 23, "apparats" should read --apparatus--.

Signed and Sealed this

Eleventh Day of July, 2006

JON W. DUDAS
*Director of the United States Patent and Trademark Office*